UNITED STATES PATENT OFFICE.

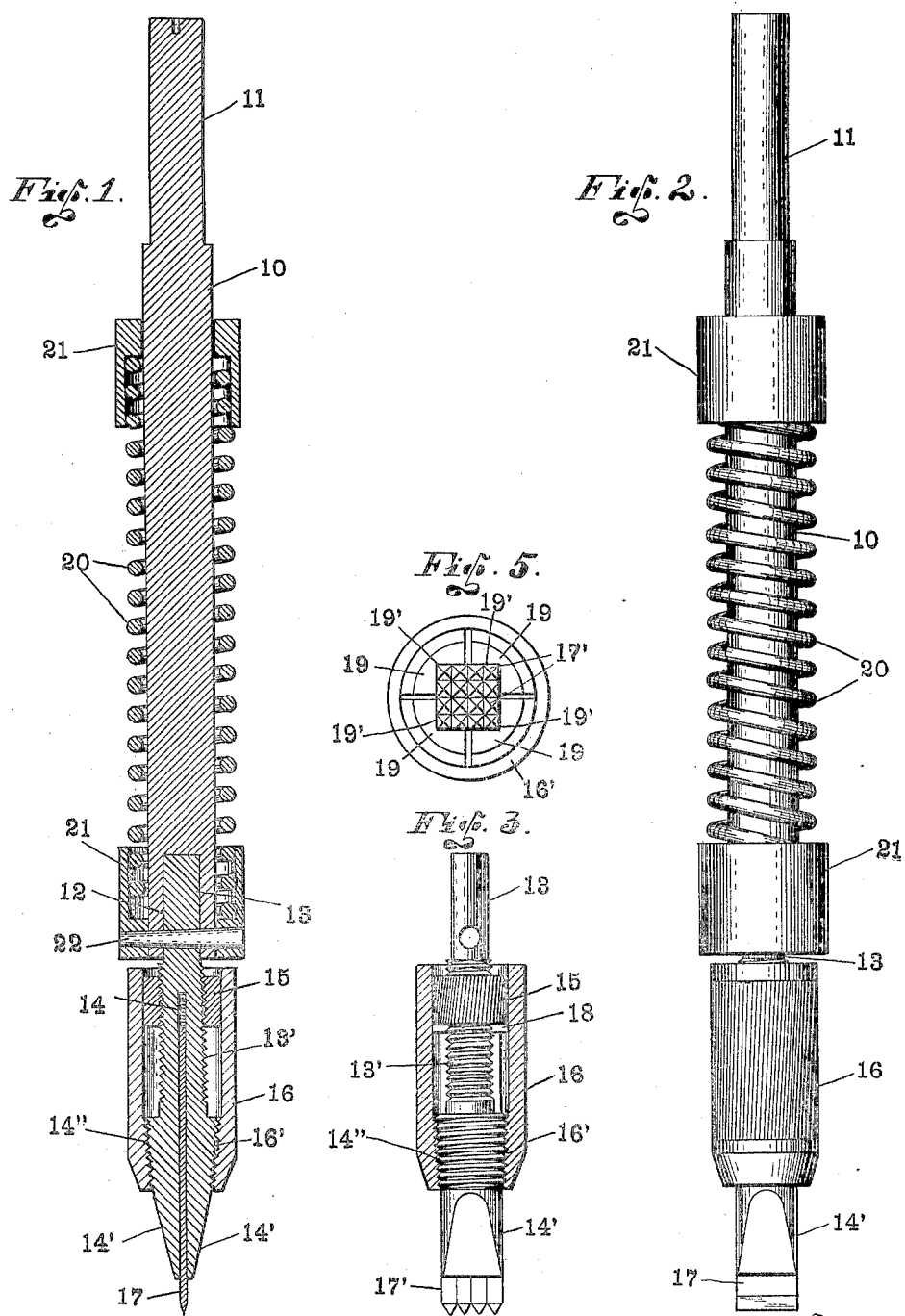

STEPHEN W. GOODHUE, OF INDIANAPOLIS, INDIANA, ASSIGNOR OF ONE-HALF TO OPAL SEDGWICK, OF CASEY, ILLINOIS.

CUSHION TOOL-HOLDER FOR PNEUMATIC HAMMERS.

No. 802,449.   Specification of Letters Patent.   Patented Oct. 24, 1905.

Application filed October 3, 1904. Serial No. 227,028.

*To all whom it may concern:*

Be it known that I, STEPHEN W. GOODHUE, a citizen of the United States, residing at Indianapolis, in the county of Marion and State of Indiana, have invented certain new and useful Improvements in Cushion Tool-Holders for Pneumatic Hammers, of which the following is a specification.

At the present time the tools used by stonecutters are of considerable length in order to afford a handhold on the tool proper, this being the case whether said tools are used in connection with a hand-hammer or in the modern manner in connection with an air-hammer. In the use of such a tool considerably over two-thirds of the tool is waste for the reason that after about one-third of the tool has been worn away from the cutting end the remainder is too short to be used and must either be worked over into smaller tools or thrown away. The steel necessarily used in tools of this kind because of the waste must be of the old-fashioned kind which requires tempering, and consequently a very material portion of the time required on any job is consumed in the sharpening of tools.

The object of my invention is to provide a tool-holder especially adapted for use in connection with pneumatic hammers, but not necessarily limited to such use, capable of receiving small pieces of steel of the required cross-section, the arrangement being such that the more expensive self-tempering or "high-speed" steel may be used and also such that these short pieces of steel may be continuously projected from the tool, so that the waste shall be very small.

In the use of pneumatic hammers it is found that the hand and arm of the operator in which the cutting-tool itself is held becomes numbed after a short time because of the continuous vibration imparted by the pneumatic hammer; and the further object of my invention is to provide the tool-holder already described with a peculiar spring-handle by means of which the holding-hand will not receive the vibrations of the hammer.

The accompanying drawings illustrate my invention.

Figure 1 is a central vertical sectional view of a tool holder and handle embodying my invention; Fig. 2, an elevation of the tool shown in Fig. 1 at right angles to said figure. Fig. 3 is a vertical sectional detail of the holder with a slightly different form of tool therein; Fig. 4, a plan of the tool shown in Fig. 3, and Fig. 5 a plan of a modified form of holder for receiving a series of cutters arranged to form a surfacing-tool.

In the drawings, 10 indicates the main body or shank of the holder, provided at its upper end with an ensmalled portion 11, adapted to fit into a pneumatic hammer and receive the blows therefrom. The lower end of shank 10 is provided with a socket 12, into which fits the stem 13 of the holder proper. This stem is split axially by a slot 14 to form a pair of jaws or fingers 14' 14', which jaws are tapered or conical upon their exteriors and threaded on said conical portion at 14''. Above the conical portion of the jaws the shank 13 is threaded, as at 13', to a point considerably below the upper or inner end of the slot 14, and mounted upon these threads is an adjusting collar or abutment 14. Threaded upon the conical threads 14'' is a clamping-shell 16, which is provided with a tapered threaded portion 16', mating with the threads 14'', the arrangement being such that by turning the shell in one direction upon the threads 14'' the jaws 14' will be clamped together, and thus serve to hold in the slot between the jaws the cutting-chisel 17, said chisel being preferably made of high-grade steel and of such length that its inner end abuts against the abutment 15. The tool 17 may assume several forms—as, for instance, as shown in Fig. 3, instead of being made in a single piece, I show the tool as formed of a plurality of lengths 17', each of which is provided at its cutting end with a pyramidal head. In this form I have shown four chisels 17', arranged between the jaws 14'. In such construction it is necessary to place in slot 14 at the inner end of the chisel 17' a cross-piece 18, which cross-piece itself lies between the inner ends of the chisels and the abutment 15.

It will be readily understood that the form of jaws 14' may be varied to suit the desired tool to be used without departing from my invention. For instance, in Fig. 5 I have shown an end view of a holder provided with four jaws 19, each having a right-angled notch 19' formed in its inner corner in order to receive a group composed of a multiplicity of chisels 17', each of which is provided with a pyramidal cutting end, the group thus forming what is commonly termed a "surfacing-tool." The four jaws 19 will be clamped upon the group of chisels by means of a clamping-shell 16' like the shell 16. In order to relieve the hand of the operator from the jar of the tool, I provide a handle composed of a spring 20, which has secured to each of its ends a collar 21, the collars being secured to the spring in any suitable manner, preferably by brazing. The lower collar 21 is then secured to the shank 10 in any desired manner, leaving the upper collar free. For convenience in manufacture I use a single tapered pin 22, which passes through the lower collar 21, the shank 10, and the shank 13, thus securing all the parts together. It will be understood that the lower collar 21 may be left free and the upper collar 21 attached to the shank, if desired. The cutting-chisels 17 are projected from the holder just enough to enable the operator to retain a good view of the cutting end of the chisels at all times, and as the chisels wear the abutment 15 is adjusted downward along the threads 13', so that the greater portion of the chisels may be used.

I claim as my invention—

1. A tool-holder consisting of a main body carrying in its lower end a pair of jaws between which a tool may be inserted, a clamping-shell threaded on said jaws, and an abutment also threaded upon said jaws within said shell and arranged to engage the inner end of the tool mounted between the jaws.

2. A tool-holder consisting of a main body carrying in its lower end a pair of jaws between which a tool may be inserted, a clamping-shell threaded on said jaws, an abutment also threaded upon said jaws and arranged to engage the inner end of the tool mounted between the jaws within said shell, and a handle consisting of a spring member attached at one end only to said holder and of less length than the body of the tool whereby a portion projects through the handle.

3. A tool-holder consisting of a main body carrying in its lower end a pair of jaws between which a tool may be inserted, a clamping-shell threaded on said jaws, an abutment also threaded upon said jaws and arranged to engage the inner end of the tool mounted between the jaws, and a handle consisting of a spiral spring inclosing the holder-body and provided at one end with means for attachment to said body, said spiral spring being of less length than the holder-body whereby its force-receiving end will project through.

In witness whereof I have hereunto set my hand and seal, at Indianapolis, Indiana, this 26th day of September, A. D. 1904.

STEPHEN W. GOODHUE. [L. S.]

Witnesses:
 ARTHUR M. HOOD,
 JAMES A. WALSH.